United States Patent [19]
Ozeki et al.

[11] Patent Number: 4,811,113
[45] Date of Patent: Mar. 7, 1989

[54] IMAGE SIGNAL ENCODING METHOD AND SYSTEM

[75] Inventors: Yoshiaki Ozeki, Atsugi; Makio Kondo, Sagamihara; Hayashi Taniguchi, Komae, all of Japan

[73] Assignee: Ricoh Company, Ltd., Tokyo, Japan

[21] Appl. No.: 63,426

[22] Filed: Jun. 18, 1987

[30] Foreign Application Priority Data

Jun. 18, 1986 [JP] Japan ................... 61-140370

[51] Int. Cl.$^4$ .............................................. H04N 7/12
[52] U.S. Cl. .................................. 358/261.1; 341/63
[58] Field of Search ...................... 358/260, 261, 262; 340/377 DD; 382/56

[56] References Cited

U.S. PATENT DOCUMENTS

| | | | |
|---|---|---|---|
| 4,151,562 | 4/1979 | Tregay | 358/260 |
| 4,580,162 | 4/1986 | Mori | 358/260 |
| 4,673,987 | 6/1987 | Toyokawa | 358/261 |
| 4,701,803 | 10/1987 | Sato | 358/261 |

*Primary Examiner*—Edward L. Coles, Sr.
*Attorney, Agent, or Firm*—Oblon, Fisher, Spivak, McClelland & Maier

[57] ABSTRACT

An encoding/decoding method for carrying out conversion between run lengths and corresponding run length codes is provided. The run length codes has a format including a first part for storing first information and a second part for storing second information. The first information indicates the length of the code and the second information indicates the corresponding run length. The total number of bits of each of the run length codes is set as an integral multiple of a predetermined number of bits. The present encoding/decoding method is suitable for use in an image processing system, such as a facsimile machine.

5 Claims, 13 Drawing Sheets

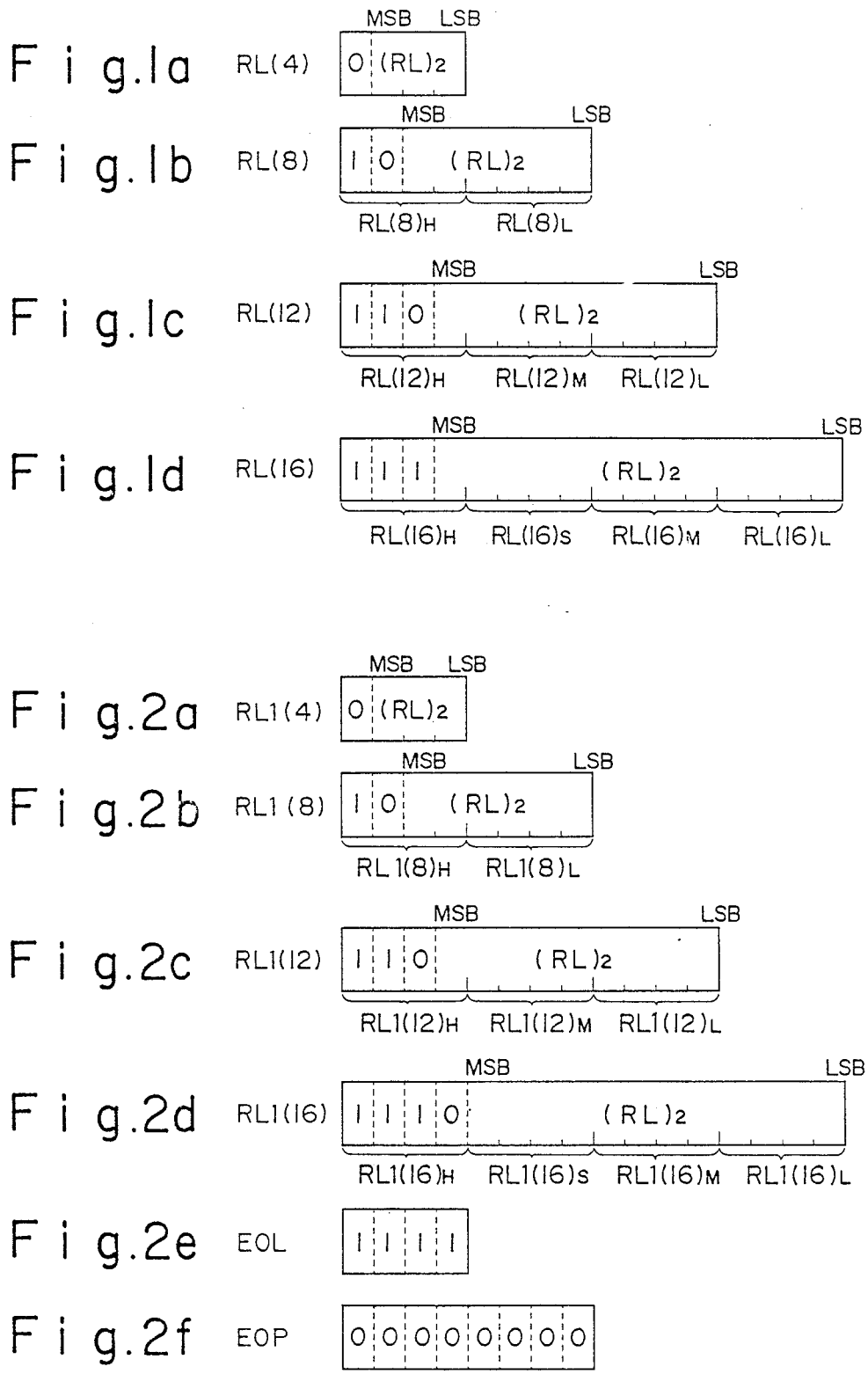

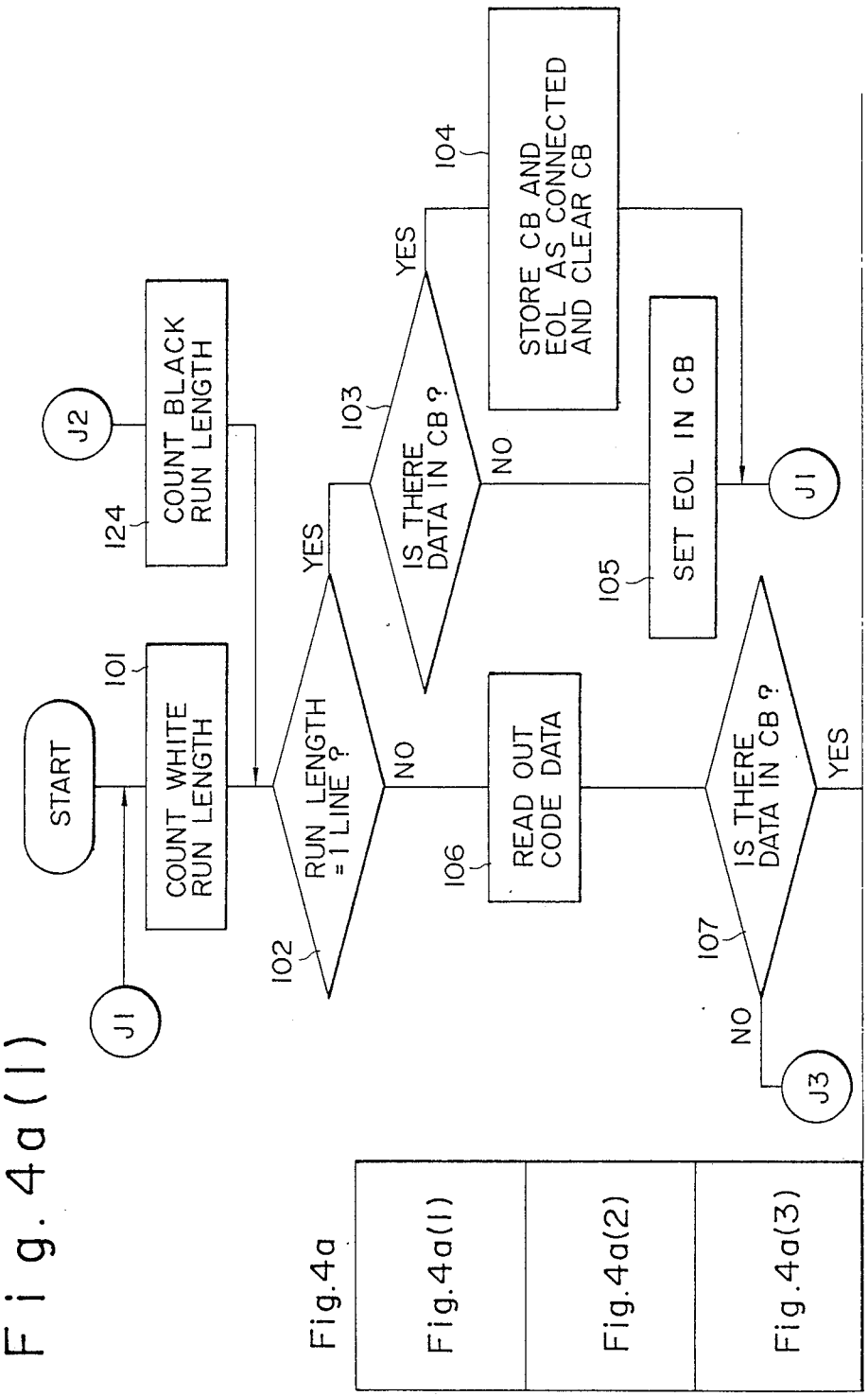

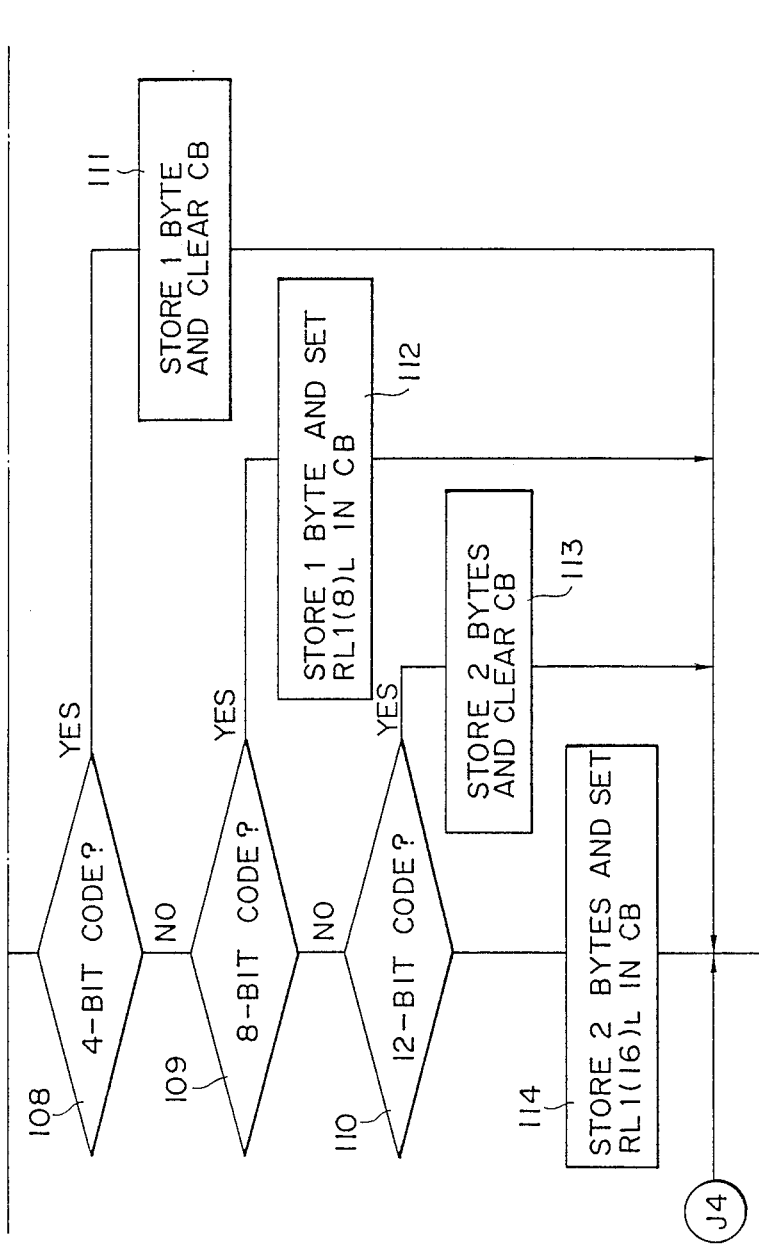

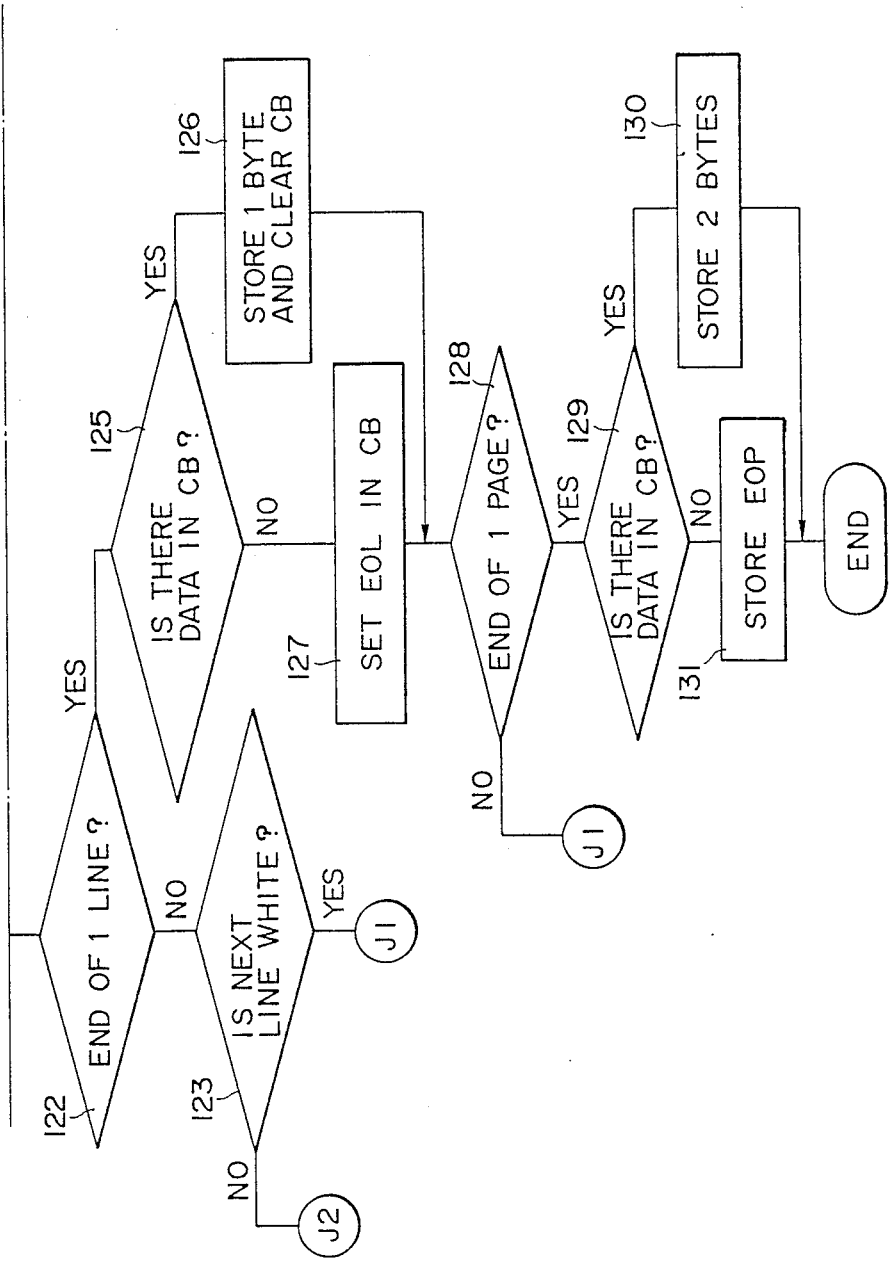

| | MSB | LSB |
|---|---|---|
| m | RL1(4) | RL1(8)H |
| m+1 | RL1(8)L | RL1(12)H |
| m+2 | RL1(12)M | RL1(12)L |

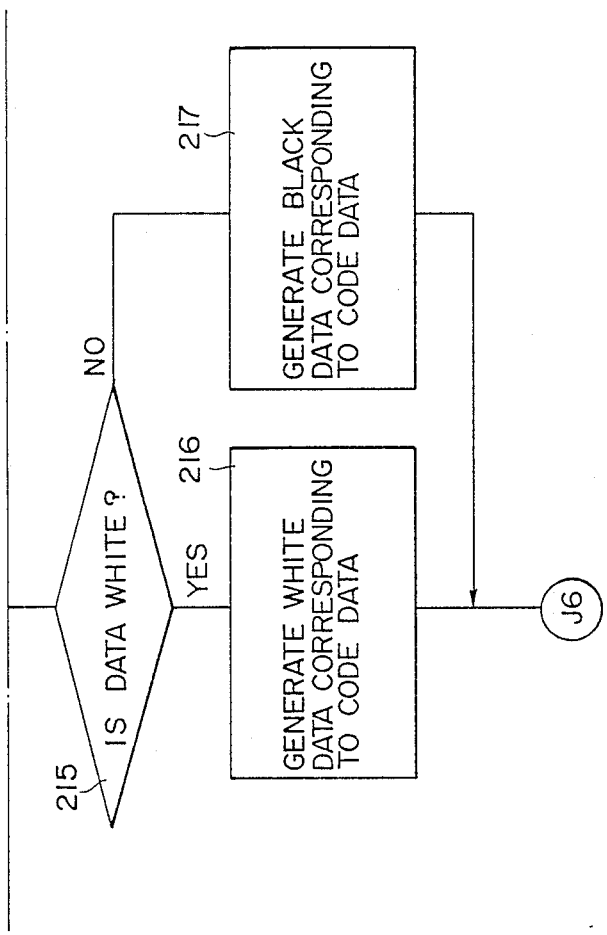
Fig. 6c
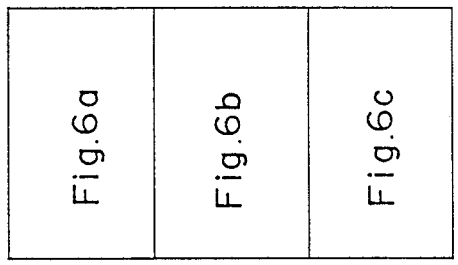

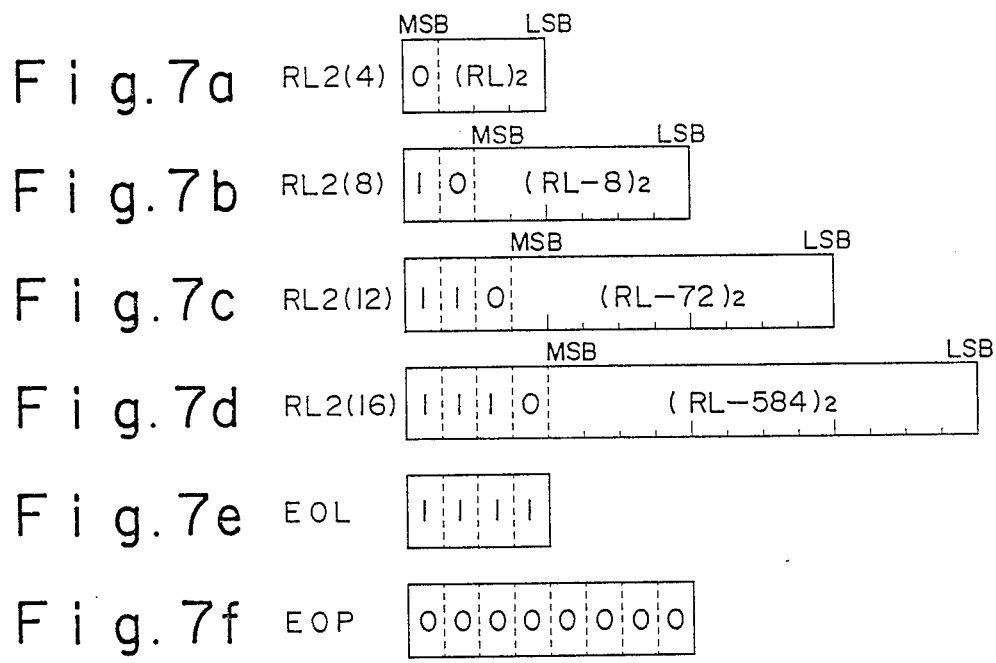

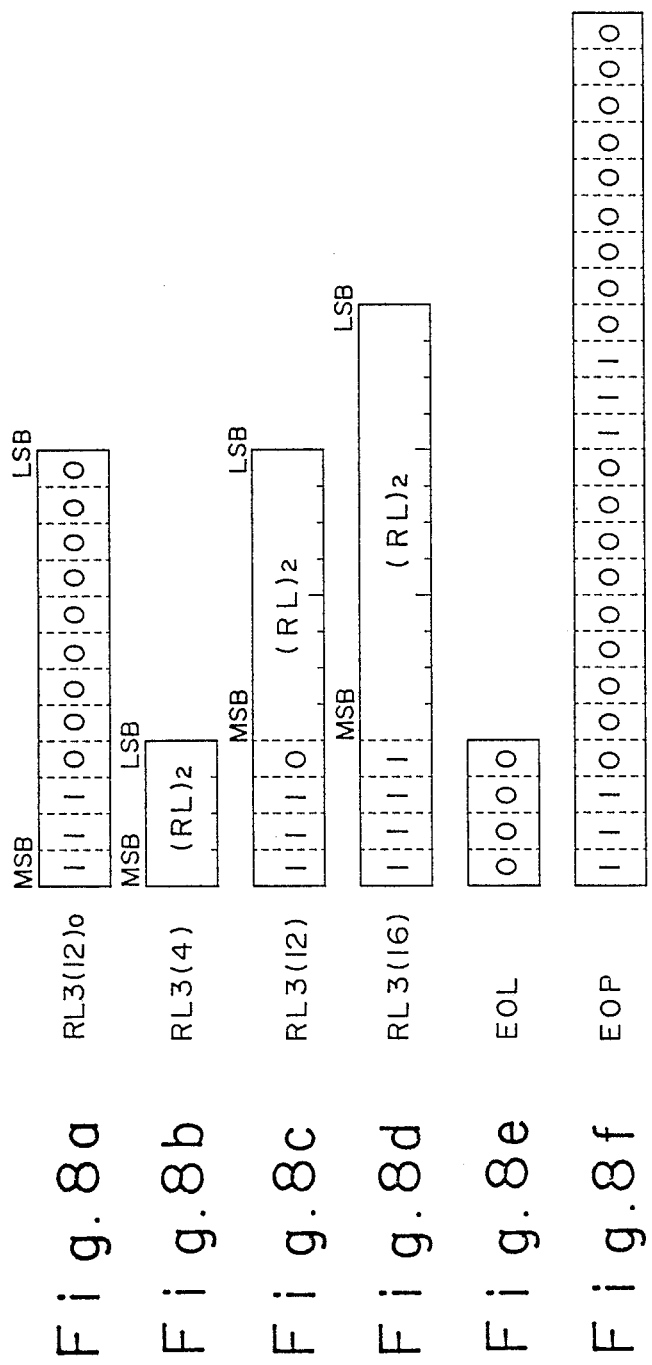

Fig.9a RL4(8)₀ | 1 | 1 | 0 | 0 | 0 | 0 | 0 | 0 |

Fig.9b RL4(4) | (RL)₂ |  (MSB ... LSB)

Fig.9c RL4(8) | 1 | 1 | 0 | (RL)₂ |  (MSB ... LSB)

Fig.9d RL4(12) | 1 | 1 | 1 | 0 | (RL)₂ |  (MSB ... LSB)

Fig.9e RL4(16) | 1 | 1 | 1 | 1 | (RL)₂ |  (MSB ... LSB)

Fig.9f EOL | 0 | 0 | 0 | 0 |

Fig.9g EOP | 1 | 1 | 0 | 0 | 0 | 0 | 0 | 0 | 1 | 1 | 0 | 0 | 0 | 0 | 0 | 0 |

IMAGE SIGNAL ENCODING METHOD AND SYSTEM

BACKGROUND OF THE INVENTION

1. Field of the Invention

This invention generally relates to a method and system for encoding an image signal so as to compress the image signal, and, in particular, to an image signal encoding method and system using codes having a particular format beginning with code length information followed by run-length information.

2. Description of the Prior Art

In general, image information is enormous in the quantity of data, so that if it is tried to store or transmit it as it is, it is required to provide a memory having an extremely large capacity and also the time required for transmitting image information of one page becomes extremely long, thereby causing practical inconveniences and disadvantages.

Under the circumstances, it has been proposed and is being currently applied to reduce the amount of information of image information by compressing the image information by encoding with the utilization of a particular characteristic of image information, in particular redundancy of image information. For example, among various facsimile machines for transmitting image information, in a G3 type facsimile machine, whose standard specification has been determined by the CCITT Recommendations T.4, use is made of the MH (Modified Huffman) encoding method as a standard method (one dimensional encoding method) for encoding image information. This MH encoding method is one of the run-length encoding methods which converts a run length corresponding to a distance between points of change appearing in a series of image data, and a Huffman code, which is one of optimal solutions of an instantaneous code, is represented by a combination of a terminating code and a make up code. With the use of such MH codes, the amount of hardware required for implementation of this encoding processing is reduced.

The MH codes are variable length codes defined by the number of bits ranging from 2 to 13 bits, and, thus, in order to carry out encoding and decoding operations using the MH codes in real time in association with the date transmission speed of a facsimile in use, a bit processing operation must be carried out at an extremely high speed. On the other hand, for example, the processing unit of a general purpose microprocessor is 8(4) or 16(32) bits, so that, if the data of the number of bits other than these is to be processed by a general purpose microprocessor, the format of the data must be adjusted before processing. Accordingly, to process variable length data requires an additional time period which can be extensive, thereby prohibiting to carry out data processing in real time. In order to compensate for this requirement of additional processing, there must be provided a dedicated hardware for carrying out encoding and decoding using the MH codes; however, this then pushes up the cost. Thus, the utilization of the MH codes conventionally negated the idea of direct application to general purpose microprocessors having a fixed format for data to be processed.

SUMMARY OF THE INVENTION

In accordance with the principle of the present invention, there is provided a method and system for encoding image data which is suitable for application to general purpose microprocessors having a fixed format of data to be processed. The present invention uses codes each of which begins with code length information indicating the length of the code, followed by run length information indicating run length in terms of the binary number, whereby the code length of each code is defined by an integral multiple of a predetermined number of bits. For example, the predetermined number of bits may be selected to be "4", in which case a basic and first code is comprised of four bits and a second code is comprised of eight bits, so that such codes are defined by an integral multiple of four bits and thus can be directly applied to a general purpose microprocessor which processes data at a unit of integral multiple of four.

It is therefore a primary object of the present invention to obviate the disadvantages of the prior art as described above and to provide an improved method and system for encoding and decoding image data.

Another object of the present invention is to provide an improved image signal encoding/decoding method and system which can be implemented by a general purpose microprocessor in real time without an extensive, dedicated hardware.

A further object of the present invention is to provide an improved image signal encoding/decoding method and apparatus fast in operation and easy to implement.

A still further object of the present invention is to provide an improved image signal encoding/decoding method and apparatus which can be executed in real time simply by software, and, thus, low at cost in its implementation.

Other objects, advantages and novel features of the present invention will become apparent from the following detailed description of the invention when considered in conjunction with the accompanying drawings.

BRIEF DESCRIPTION OF THE DRAWINGS

FIGS. 1a through 1d are illustrations showing a set of run length codes constructed in accordance with one embodiment of the present invention;

FIGS. 2a through 2f are illustrations showing a set of run length codes constructed in accordance with another embodiment of the present invention;

FIG. 4a is an illustration showing how to combine FIGS. 4a(1) through 4a(3);

FIGS. 4a and 4b, together, define a flow chart illustrating a sequence of steps of encoding processing to be carried out by the system shown in FIG. 3;

FIG. 5a is an illustration showing a series of image data with the designation of run length between two adjacent points of change in image information;

FIG. 5b is an illustration showing one example of storing the run length codes of a series of run lengths illustrated in FIG. 5a;

FIG. 6 is an illustration showing how to combine FIGS. 6a through 6c;

FIGS. 6a through 6c, when combined as illustrated in FIG. 6, defin a flow chart showing one example of decoding processing;

FIGS. 7a through 7f are illustrations showing a set of run length codes constructed in accordance with a further embodiment of the present invention;

FIGS. 8a through 8f are illustrations showing a set of run length codes constructed in accordance with a still further embodiment of the present invention; and FIGS. 9a through 9g are illustrations showing a set of run length codes constructed in accordance with a still further embodiment of the present invention.

DESCRIPTION OF THE PREFERRED EMBODIMENTS

Figure 3:
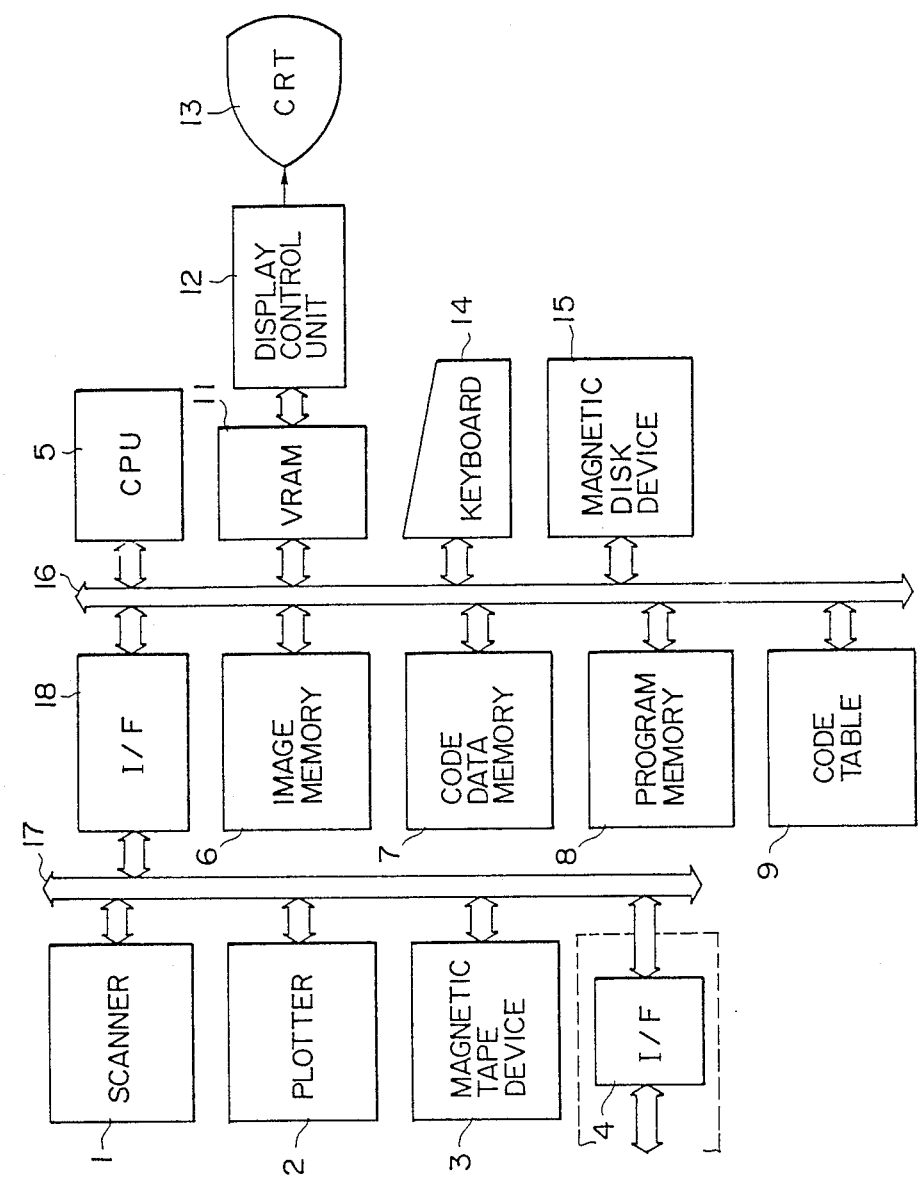
FIG. 3 is a block diagram showing the overall structure of an image processing system constructed in accordance with one embodiment of the present invention.
Figure 4B:
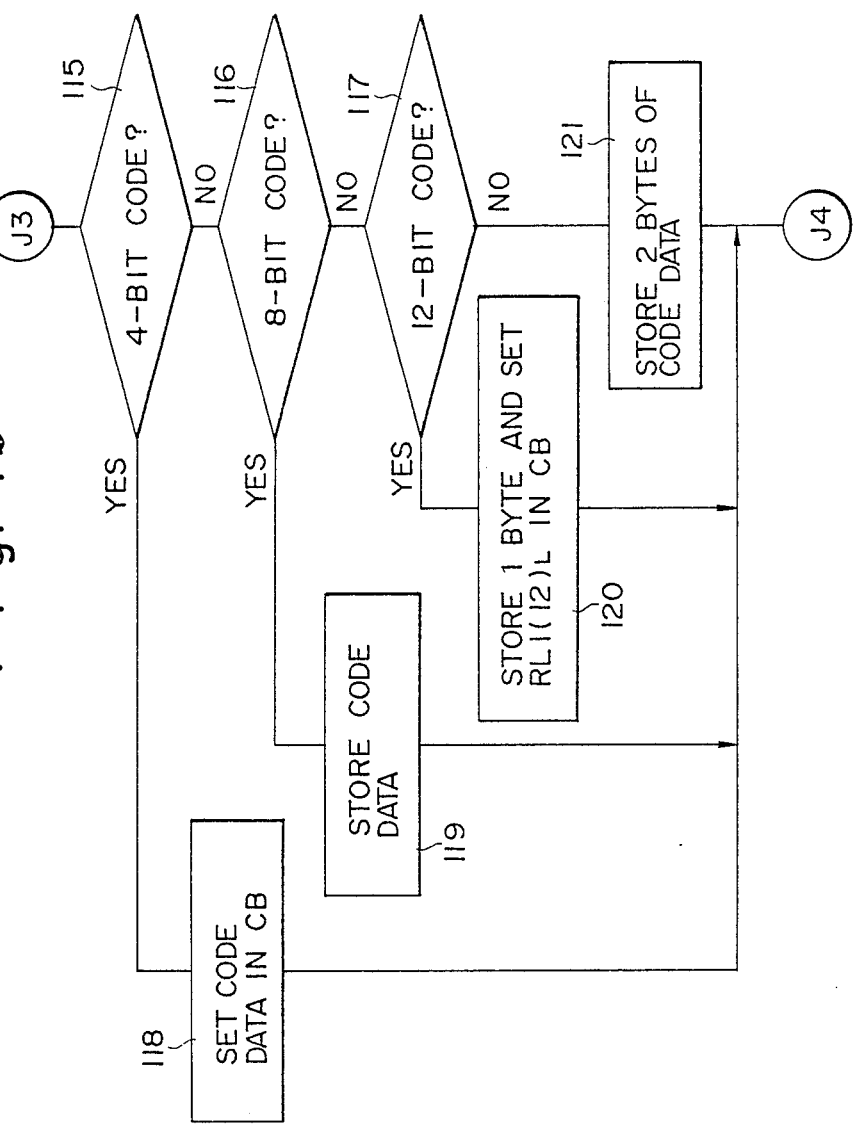

Referring now to FIGS. 1a through 1d, there are shown a set of run length codes constructed in accordance with one embodiment of the present invention and this set of run length codes defines a basic set of run length codes in the present invention. As shown, the set includes four kinds of run length codes each different in code length, i.e., first run length code RL(4) comprised of four bits, second run length code RL(8) comprised of eight bits, third run length code RL(12) comprised of twelve bits and fourth run length code RL(16) comprised of sixteen bits. Of importance, each of these run length codes is comprised of the number of bits which corresponds to an integral multiple of four bits, and, thus, the code length of each of these codes is also an integral multiple of "four".

The first run length code RL(4) is to be used for indicating a run length in a range from "0" to "7", and it includes the binary number "0" in its fourth bit location, which indicates the fact that the code has a code length of four bits and a three-bit data $(RL)_2$ indicating the run length in terms of the binary number in its third to first bit locations with the MSB (most significant bit) of the data $(RL)_2$ located at the third bit location. The second run length code RL(8) is to be used for indicating a run length in a range from "8" to "63" and contains the binary data "10" at its eight and seventh bit locations, which indicates the fact that the code length is eight bits. In the sixth to first bit locations of the second code RL(8) is contained a 6-bit data $(RL)_2$ indicating a particular run length between "8" and "63" in terms of the binary number with its MSB located at the sixth bit location. In addition, the third run length code RL(12) is to be used for indicating a run length in a range from "64" to "511" and contains the binary data "110" at its twelfth to tenth bit locations, which indicates the fact that the code length is twelve bits. In the ninth to first bit locations of the third code RL(12) is contained a 9-bit data $(RL)_2$ indicating a particular run length between "64" and "511" in terms of the binary number with its MOS located at the ninth bit location. Moreover, the fourth run length code RL(16) is to be used for indicating a run length in a range from "512" to "8191" and contains the binary data "111" at its sixteenth to fourteenth bit locations, which indicates the fact that the code length is sixteen bits. In the thirteenth to first bit locations of the fourth code RL(16) is contained a 13-bit data $(RL)_2$ indicating a particular run length between "512" and "8191" in terms of the binary number with its MSB located at the thirteenth bit location.

In a manner similar to the MH encoding method, also in accordance with the present invention, encoding and decoding is carried out one line as a unit with each line starting with a while pixel data. If a line starts with a black pixel data, then the first run length code of the line is preceded by a code $RL(4)_0$ which indicates the fact that the white run lingth is "0". Thus, each line is adjusted to start with a white run length code.

In this manner, in accordance with the present invention, the first byte, or four bits, of each of these run length codes RL(4), RL(8), RL(12) and RL(12) contains the binary data pattern indicating the length of the code, and, thus, by interpreting this binary data pattern, the code length of the corresponding run length code can be determined. In addition, all of these codes canbe treated as a combination of a data comprised of four bits as a unit. That is, the second run length code RL(8) may be divided into an upper component $RL(8)_H$ of upper four bits and a lower component $RL(8)_L$ of lower four bits. The third run length code RL(12) may be divided into an upper component $RL(12)_H$ of upper four bits, an intermediate component $RL(12)_M$ of intermediate four bits and a lower component of $RL(12)_L$ of lower four bits. In addition, the fourth run length code RL(16) may be divided into an upper component $RL(16)_H$ of upper four bits, an upper intermediate component $RL(16)_S$ of upper intermediate four bits, a lower intermediate component $RL(16)_M$ of lower intermediate four bits and a lower component of $RL(16)_L$ of lower four bits. In this manner, each of the run length codes can be broken down with four bits as a unit.

The run length is a continuous length of particular information in a scanning line. Typically, an image signal of a scanning line obtained by scanning an original image includes black pixel data, indicating an image portion, and white pixel data, indicating the background portion. And a continuous series of black pixel in a scanning line defines a run length of a portion of the image along that scanning line. In this manner, the run length is determined based on the contents of image data contained in a line to be encoded. Accordingly, there is no regularity in the occurrence of these four different run length codes RL(4), RL(8), RL(12) and RL(16) when a line is encoded. Under the circumstances, for example, in the case where the internal data bus in an encoding/decoding processing system constructed by using a general purpose microprocessor has an 8-bit width, the code data may be input into and output from the system by treating them with four bits as a unit. As a result, in arranging the run length codes obtained by encoding into processing units of the system and also in arranging the run length codes into procesing units of the system in decoding operation, the required processing is extremely facilitated.

In decoding processing, if it is so structured that the color information (white or black information) of the data being encoded is stored during an encoding operation, the remaining bit data of a run length code excepting the data indicating the code length of the corresponding run length code directly indicates the run length as it is, so that detection of a run length can be carried out extremely simply. In this manner, in accordance with the present invention, since encoding and decoding processing operations can be implemented extremely simply, so that, when the present invention is applied to a facsimile machine, the encoding and decoding processing operation of image information can be carried out in real time using software without requiring to provide a dedicated hardware. In addition, since there is no need to provide an extensive hardware and image data compression processing can be carried out by a general purpose 8-bit microprocessor, the present invention allows to carry out image processing, in particular image compression and decompression, by an inexpensive personal computer or the like.

In the case of the basic set of run length codes shown in FIGS. 1a through 1d, in order to detect the demarcation or end points of a line in a series of code data during a decode processing operation, the number of bits of the decoded image information must be counted. In addition, even if a line consists of all white pixel data, which could occur rather often in the case of a document image, it is encoded into a code data of 16 bits, which is not so efficient.

FIGS. 2a through 2f show another set of run length codes constructed in accordance with another embodiment of the present invention, which is free of the above-described disadvantages associated with the basic set of run length codes shown in FIGS. 1a through 1d. This second set of run length codes includes six different codes, i.e., a first run length code RL1(4) including four bits, a second run length code RL1(8) including eight bits, a third run length code RL1(12) including twelve bits, a fourth run length code RL1(16) including sixteen bits, a line end code EOL ($=(1111)_2$) which includes four bits and indicates the end of a line, and a page end code EOP ($=(00000000)_2$) which includes eight bits and indicates the end of a page. It is to be noted that the run length codes RL1(4), RL1(8) and RL1(12) are identical in contents to the run length codes RL(4), RL(8) and RL(12) of the basic set. The end of page code EOP is formed by arranging the code RL1(4)$_0$ indicating 0 run length back to back. The fourth run length code RL1(16) of this set is to be used for indicating a run length in a range from "512" to "4095", and it includes the binary data pattern of "1110" at the sixteenth to thirteenth bit locations, which pattern indicates that the code length of this code is 16 bits. In the twelfth to first bit locations of this code is contained a 12-bit data $(RL)_2$, which indicates a run length in terms of the corresponding binary number, with its MSB located at the twelfth bit location.

Accordingly, with the set of codes shown in FIGS. 2a through 2f, the run length of up to "4095" can be represented. Thus, in the case where the resolution in reading an image in the main scanning direction is 8 dots/mm, this set of codes can be applied to a reading width of up to 521 mm (size of the shorter side of a B2 size paper), and in the case where the resolution is 16 dots/mm, it can be applied to a reading width of up to 256 mm (size of the shorter side of a B4 size paper).

With the present set of codes, the end of line code EOL is inserted at the end of a line. If a line is all white, only the end of line code EOL is assigned. On the other hand, if a line is all black, then there is assigned a run length code RL1(4)$_0$, which indicates the fact that the white run length is 0, followed by the end of line code EOL. In addition, at the end of a page, there is assigned the end of page code EOP. The remaining rules in assigning codes are similar to those described above with reference to the basic set of codes shown in FIGS. 1a through 1d. In this manner, in accordance with the present encoding scheme using the set of codes illustrated in FIGS. 2a through 2f, an all white line is converted into the end of line code EOL of 4 bits, there is obtained an enhanced compression efficiency as compared with the previously described basic set of codes.

FIG. 3 shows in block form an image processing system capable of implementing encoding and decoding operations in accordance with the principle of the present invention. As shown, the image processing system includes a scanner 1 for optically reading an image on an original at a predetermined resolution. The system also includes a printer or plotter 2 for recording an image on a recording medium at a predetermined resolution and a magnetic tape device 3 for storing image data which have been encoded using a set of predetermined run length codes constructed in accordance with one embodiment of the present invention. The present image processing system is connected to an external device via an interface circuit 4, so that data may be exchanged with the external device through the interface circuit 4. Also provided in the system is a central processing unit (CPU) 5 which controls the processing of image data to be carried out by the system. In addition, the system also includes an image memory 6 for storing original image information prior to encoding or image information after decoding, a code data memory 7 for storing run length codes after or before encoding, a program memory 8 for storing a processing program to be executed by the CPU 5, and a code table 9 for storing a table defining correspondence between run lengths and run length codes.

Also provided in the system is a video random access memory (VRAM) 11 which is connected to a CRT display 13 via a display control unit 12, and, thus, when data to be displayed is transferred from the CPU 5 to the VRAM 11, the data is read out by the display control unit 12 and displayed on the screen of the CRT 13. The system also includes a keyboard 14 which permits an operator to make access and thus to control the overall operation of the present image processing system, and a magnetic disk device 15 for storing image data in the form of run length codes similarly with the magnetic tape device 3. It is to be noted that either one or both of these magnetic disk device 15 and magnetic tape device 3 may store therein any additional control program or routine. In the present image processing system the CPU 5, image memory 6, code data memory 7, program memory 8, code table 9, VRAM 11, keyboard 14 and magnetic disk device 15 are interconnected via a system bus 16; on the other hand, the scanner 11, plotter 2, magnetic tape device 3 and interface circuit 4 are connected to an external bus 17 which is connected to the system bus 16 via the interface circuit 18.

One example of the storing condition of run length codes in the code table 9 is indicated in a table 1 below.

TABLE 1

| RUN LENGTH | ADDRESS | RUN LENGTH CODE |
|---|---|---|
| 0 | x+0 | lower byte data |
|  | x+1 | upper byte data |
| 1 | x+2 | lower byte data |
|  | x+3 | upper byte data |
| 2 | x+4 | lower byte data |
|  | x+5 | upper byte data |
| ... | ... | ... |
| ... | ... | ... |
| n | x+2n | lower byte data |
|  | x+2n+1 | upper byte data |

In this manner, in the code table 9, the lower one byte data of the run length code corresponding to run length n is stored in address (x+2n) and the upper one byte data of the run length code corresponding to run length n is stored in address (x+2n+1). Besides, the run length code is stored in a state arranged in the form of a two byte data. That is, each run length code is stored such that the MSB of the data indicating the code length corresponds in bit location to the MSB of the upper byte data and the remaining bit locations are filled with 0s, as indicated in table 2 below.

TABLE 2

| CODE | UPPER BYTE DATA | | LOWER BYTE DATA | |
|---|---|---|---|---|
| | UP 4 BITS | LO 4 BITS | UP 4 BITS | LO 4 BITS |
| RL(4) | RL(4) | $(0000)_2$ | $(0000)_2$ | $(0000)_2$ |
| RL(8) | $RL(8)_H$ | $RL(8)_L$ | $(0000)_2$ | $(0000)_2$ |
| RL(12) | $RL(12)_H$ | $RL(12)_M$ | $RL(12)_L$ | $(0000)_2$ |
| RL(16) | $RL(16)_H$ | $RL(16)_S$ | $RL(16)_M$ | $RL(16)_L$ |

In this manner, a run length code can be obtained by reading out a 2-byte data from the code table 9 based on the count value of a run length.

The encoding processing operation for converting image information comprised of a series of run length values into run length codes using the system shown in FIG. 3 will now be described. In the first place, it is assumed that the image information optically read by the scanner 1 is currently stored in the image memory 6 and the number of bytes for the data of one line and the numbe of lines for one page have been transmitted to the CPU 5 from the scanner 1 in advance. It is also assumed that the CPU 5 processes data eight bits as a unit when making access to the image memory 6 and to the code data memory 7, and, therefore, in the present processing, the four remaining bits produced after encoding using the present set of run length codes are stored in a variable of previous data remaining CB. In addition, during processing, the information of whether the kind of the data being encoded is a white data or a black data is also stored as an internal variable. The variable of previous data remaining CB is cleared to "0" at the time when the encoding processing using a set of present run length codes for one page has been initiated.

The beginnin of a line is a white pixel data, so that the CPU 5 counts the run length of white pixel data from the beginning of a line to be encoded in the image memory 6 (step 101) and then the counted value is compared with the number of bits of a single line (step 102). If the result of this determination at step 102 is affirmative, then it is checked whether or not data is stored in the variable of previous data remaining CB (step 103), and, then, if the result of the determination at step 103 is affirmative, then one byte of data defined by upper four bits corresponding to the four bit data stored in the previous data remaining CB and lower four bits corresponding to the end of line codes EOL is stored in the code data memory 7 while clearing the previous data remaining CB (step 104). On the other hand, if the result of determination at step 103 is negative, then the end of line code EOL is set in the previous data remaining CB (step 105). Upon completion of steps 104 and 105, it goes back to step 101, thereby proceeding to an encoding processing for the next line.

If the result of determination at step 102 is negative, a run length code corresponding to the current run length is read out of the code table 9 (step 106). And, then, it is checked whether or not data is stored in the previous data remaining CB (step 107), and if the result of determination at step 107 is affirmative, then the code length of the run length code is determined by the contents of the first four bits through steps 108, 109 and 110. If the code length is four bits and the result of determination at step 108 is affirmative, then a data of one byte including the upper four bits defined by the previous data remaining CB and the lower four bits defined by the 4-bit run length code thus read out is stored in the code data memory 7 while clearing the previous data remaining CB (step 111). On the other hand, if the code length is eight bits and the result of determination at step 109 is affirmative, then a data of one byte including the upper four bits defined by the previous data remaining CB and the lower four bits defined by the run length code $RL1(8)_H$ is stored in the code data memory 7, and, at the same time, the run length code $RL1(8)_L$ is set in the previous data remaining CB (step 112).

If the code length is 12 bits and the result of determination at step 110 is affirmative, then a data of one byte including the upper four bits defined by the previous data remaining CB and the lower four bits defined by the run length code $RL1(12)_H$ and a data of one byte including the upper four bits defined by the run length code $RL1(12)_M$ and the lower four bits defined by the run length code $RL1(12)_L$ are stored into the code data memory 7 in sequence while clearing the previous data remaining CB (step 113). If the code length is 16 bits and the result of determination at step 110 is negative, then a data of one byte including the upper four bits defined by the previous data remaining CB and the lower four bits defined by the run length code $RL1(16)_H$ and a data of one byte including the upper four bits defined by the run length code $RL1(16)_S$ and the lower four bits defined by the run length code $RL1(16)_M$ are stored into the code data memory 7 in sequence, and the run length code $RL1(16)_L$ is set in the previous data remaining CB (step 114).

If the result of determination at step 107 is affirmative, then the code length of a run length code is determined by the contents of the first four bits through steps 115 through 117. If the code length is four bits and the result of determination at step 115 is affirmative, then the 4-bit run length code thus read out is set in the previous data remaining CB (step 118). If the code length is eight bits and the result of determination at step 116 is affirmative, then the 8-bit run length code thus read out is stored in the code data memory 7 (step 119). If the code length is twelve bits and the result of determination at step 117 is affirmative, then a data of one byte including the upper four bits defined by the run length code $RL1(12)_H$ and the lower four bits defined by the run length code $RL1(12)_M$ is stored in the code data memory 7, and the run length code $RL1(12)_L$ is set in the previous data remaining CB (step 120).

If the code length is sixteen bits and the result of determination at step 117 is negative, then a data of one byte including the upper four bits defined by the run length code $RL1(16)_H$ and the lower four bits defined by the run length $RL1(16)_S$ and a data of one byte including the upper four bits defined by the run length code $RL1(16)_M$ and the lower four bits defined by the run length code $RL1(16)_L$ are stored into the code data memory 7 in sequence (step 121).

If either of the processing steps 111–114 and 118–121 has been completed, it is checked whether or not the processing operation for one line has been completed based on the number of bytes thus processed (step 122), and if the result of determination at step 122 is negative, then it is checked to see whether or not the next run or pixel is white (step 123). If the result of determination at step 123 is affirmative, then it goes back to step 101, thereby counting the next white run length and then carrying out the similar subsequent processing steps repetitively. On the other hand, if the result of determination at step 123 is negative, then it proceeds to step 124, thereby counting the next black run length and repetitively carrying out the processing steps proceeding to step 102.

If the result of determination at step 122 is affirmative, then it is checked to see whether or not data is stored in the previous data remaining CB (step 125), and if the result of determination at step 125 is affirmative, then a data of one byte including the upper four bits defined by the four bits stored in the previous data remaining CB and the lower four bits defined by the end of line code EOL is stored in the code data memory 7 and then the previous data remaining CB is cleared (step 126). On the other hand, if the result of determination at step 125 is negative, then the end of line code EOL is stored into the previous data remaining CB (step 127). Upon completion of steps 126 and 127, it is checked whether or not the processing of one page has been completed based on the number of lines thus far processed (step 128), and, then, if the result of determination at step 128 is negative, it goes back to step 101 to proceed to the processing steps for the next line.

And, if the result of determination at step 128 is affirmative, then it is checked to see whether or not data is stored in the previous data remaining CB (step 129), and if the result of determination at step 129 is affirmative, then a data of one byte including the upper four bits defined by the 4-bit data stored in the previous data remaining CB and the lower four bits defined by the upper four bits of the end of page code EOP and a data of one byte including the upper four bits defined by the lower four bits of the end of page code EOP and the lower four bits each of which is defined by "0" are sequentially stored in the code data memory 7 (step 130), and then the end of page code EOP is stored in the code data memory 7 (step 131).

In this manner, encoding processing of one page of image information is carried out, and, for example, in a manner illustrated in FIG. 5b, the run length codes for a series of run lengths illustrated in FIG. 5a are stored in the code data memory 7. It is to be noted that, in the present example, there is produced a series of run length codes, including 4-bit code RL1(4), 8-bit code RL1(8) and 12-bit code RL1(12) in the order mentioned.

Figure 6A:
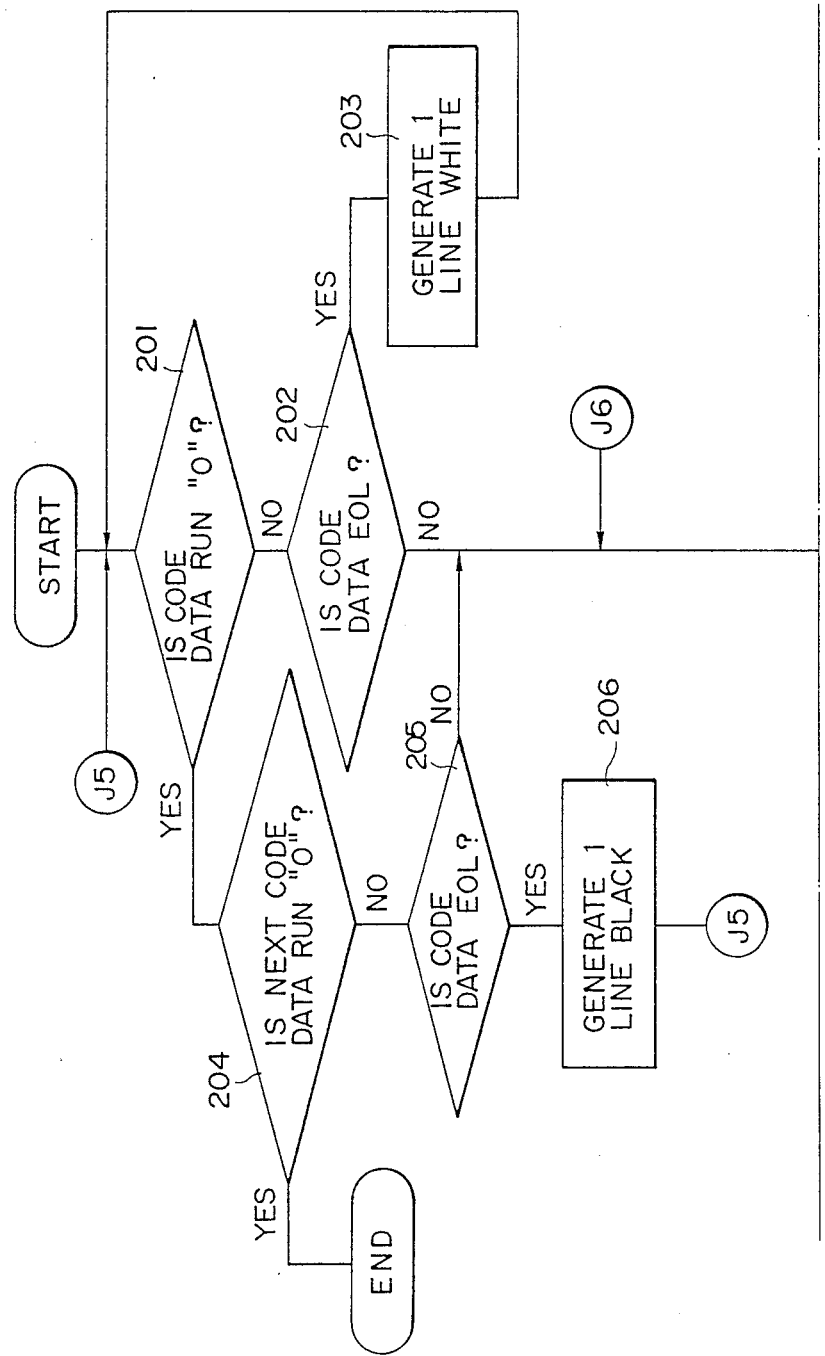
Figure 6B:
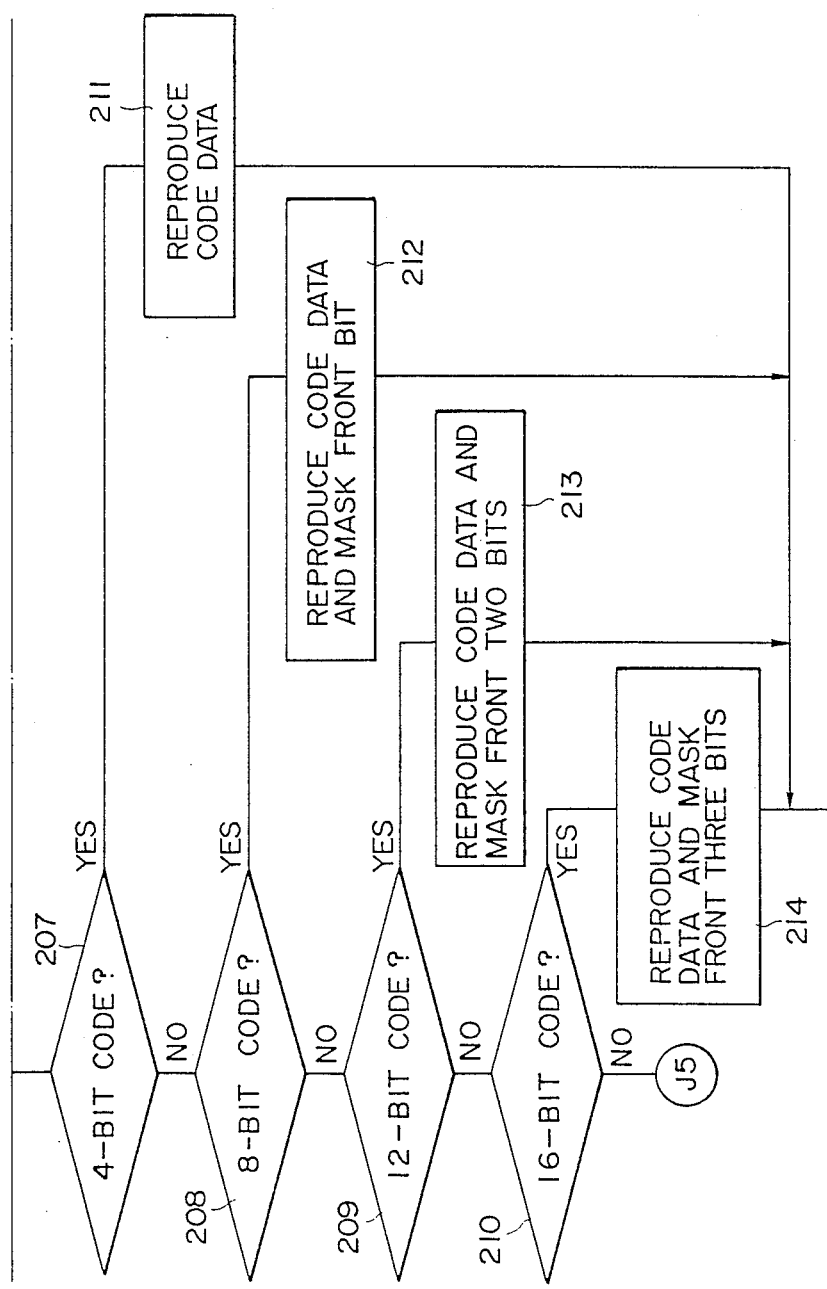

Next, the decoding processing operation in accordance with the present invention will be described below with particular reference to FIGS. 6a through 6c, which illustrates a flow chart for implementing the decoding processing for one page of encoded data as one embodiment of the present invention. In this case, as a premise, it is assumed that the encoded image information defined by the present run length codes is stored in the code data memory 7 as transferred from either the magnetic tape device 3 or the magnetic disk device 15.

In the first place, the CPU 5 examines in the code data memory 7 whether the data of the upper four bits or lower four bits of a byte indicated, for example, by a file pointer is run "0" or not (step 201). If the result of determination at step 201 is negative, then it is checked whether the data is equal to the end of line code EOL or not (step 202). And, if the result of determination at step 202 is affirmative, then the run length code indicates "one line of all white", so that an image signal of all white one line is produced and stored in the image memory 6 (step 203). Then, it goes back to step 201. On the other hand, if the result of determination at step 201 is affirmative, then the next four bits of data are read out and checked whether or not they constitute run "0" (step 204), and if the result of determination at step 204 is affirmative, then the processing is terminated because the run length code thus read out is the end of page code EOP.

If the result of determination at step 204 is affirmative, then it is checked whether the four bits of data are equal to the end of line code EOL (step 205), and if the result of determination at step 205 is affirmative, since its run length code indicates "one line of all black", an image signal of all black one line is produced and stored in the image memory 6 (step 206). Thereafter, it goes back to step 201.

When the result of determination at step 205 becomes affirmative, it proceeds to steps which follow after the result of determination at step 202 has become negative. When the result of determination at step 202 has become negative, it is determined whether the code length of the run length code to be read out is 4 bits, 8 bits, 12 bits, or 16 bits depending on the contents of the 4-bit data thus read out (steps 207 through 210). If the code length is 4 bits and the result of determination at step 207 is affirmative, then the 4-bit data is reconstructed as a run length data as it is (step 211). If the code length is 8 bits and the result of determination at step 208 is affirmative, then there is reconstructed an 8-bit run length code containing that 4bit data, whose top 1 bit is masked and replaced with data "0", thereby reproducing a run length data (step 212). If the code length is 12 bits and the result of determination at step 209 is affirmative, then there is reconstructed a 12-bit run length code containing that 4-bit data, whose top two bits are masked and each replaced with data "0", thereby reproducing a run length data (step 213). If the code length is 16 bits and the result of determination at step 210 is affirmative, then there is reconstructed a 16-bit run length code containing that 4-bit data, whose three bits are masked and each replaced with data "0", thereby reproducing a run length data (step 214).

In this manner, when a run length data has been reproduced through steps 211–214, it is checked whether the data thus reproduced is a white data or not (step 215), and if the result of determination at step 215 is affirmative, then white data corresponding in amount to the run length data are generated and stored in the image memory 6 (step 216). In addition, if the result of determination at step 215 is negative, then there are generated black data corresponding in amount to the run length data, which are then stored in the image memory 6 (step 217). Upon completion of either of steps 216 and 217, it goes back to step 207 by renewing the 4-bit data of interest. On the other hand, if the result of determination at step 210 is negative, since the 4-bit data is the end of line code EOL, the 4-bit data of interest is renewed and then it goes back to step 201.

In this manner, the encoded image information with a set of run length codes in accordance with the present invention is decoded to reconstruct the original image information. Of course, the white and black data generated at steps 216 and 217 are stored in the image memory 6 as being arranged with 8 bits as a unit.

In the set of run length codes illustrated in FIGS. 2a through 2f, there is a combination of bits not used as a useful code in the 8-bit code RL1(8), 12-bit code RL1(12) and 16-bit code RL1(16), and, therefore, the compression efficiency for relatively short run lengths is relatively poor.

FIGS. 7a through 7f. illustrates a third set of run length codes constructed in accordance with a further embodiment of the present invention and particularly directed to obviate the above-described problem of relatively poor compresion efficiency for relatively short run lengths. In the third set of run length codes shown in FIGS. 7a through 7f, the 4-bit code RL2(4), end of line code EOL and end of page code EOP are identical to the respective code RL1(4), end of line code EOL and end of page code EOP of the second set of run length codes shown in FIGS. 2a through 2f. In the third set of run length codes, the code RL2(8) is a code to be used for indicating a run length in a range from "8" to "71" and contains the binary data pattern of "10" in the eighth and seventh bit locations, which indicates the fact that the code length of this code is 8 bits. In addition, in the sixth to first bit locations of this code, a 6-bit data $(RL-8)_2$, which is the data obtained by subtracting "8" from the run length and represented in terms of the binary number, is included with its MSB located at the sixth bit location.

In addition, the code RL2(12) is a code to be used for indicating a run length in a range from "72" to "583" and contains the binary data pattern of "110" in the twelfth to tenth bit locations, which indicates the fact that the code length of this code is 12 bits. In addition, in the ninth to first bit locations of this code, a 9-bit data $(RL-72)_2$, which is the data obtained by substracting "72" from the run length and represented in terms of the binary number, is included with its MSB located at the ninth bit location. On the other hand, the code RL2(16) is a code to be used for indicating a run length in a range from "584" to "4679" and contains the binary data pattern of "111" in the sixteenth to fourteenth bit locations, which indicates the fact that the code length of this code is 16 bits. In addition, in the thirteenth to first bit locations of this code, a 12-bit data $(RL-584)_2$, which is the data obtained by subtracting "584" from the run length and represented in terms of the binary number, is included with its MSB located at the thirteenth bit location. It is to be noted that the rules or procedure of encoding of this embodiment remain the same as those of the previous embodiment using the second set of run length codes.

FIGS. 8a through 8f illustrate a fourth set of run length codes which is constructed in accordance with a still further embodiment of the present invention. In this fourth set, an increased number of run lengths is allocated to a 4-bit run length code RL3(4) and a 12-bit data is allocated to a run length code $RL3(12)_0$ which corresponds to a rarely occurring run length 0 (one line all black). It is to be noted that no 8-bit run length code is provided in this scheme.

Described more in detail with respect to this fourth set of run length codes, the 4-bit code RL3(4) is a code to be used for indicating a run length in a range from "1" to "13" and it includes a 4-bit data $(RL)_2$ which represents a run length in terms of the binary numbers. The 12-bit code RL3(12) is a code to be used for indicating a run length in a range from "14" to "255" and it includes a binary data pattern of "1110" in its twelfth to ninth bits locatins, which pattern indicates the fact that the code length is 12 bits. In addition, in the eighth to first bit locations is included an 8-bit data $(RL)_2$, which represents the run length in terms of the binary numbers, with its MSB located at the eighth bit location. Moreover, a 16-bit run length code RL3(16) is a code to be used for indicating a run length in a range from "256" to "4095" and it includes a binary data pattern of "1111" in its sixteenth to thirteenth bit locations, which pattern indicates the fact that the code length is 16 bits. In addition, in the twelfth to first bit locations is included a 12-bit data $(RL)_2$, which represents the run length in terms of the binary numbers, with its MSB located at the twelfth bit location.

Furthermore, the code $RL3(12)_0$ is a code which indicates run length "0" and which is formed by filling "0" in each bit location of the data $(RL)_2$ of the 12-bit code RL3(12). Besides, the end of line code EOL, which indicates the end of a line, is defined by a 4-bit data of $(0000)_2$, and the end of page code EOP is a 24-bit code formed by connecting two of the run length "0" code of $RL3(12)_0$ back to back. The encoding procedure and rules are identical to those described with reference to the previous second and third sets of run length codes.

FIGS. 9a through 9g are illustrations showing a fifth set of run length codes constructed in accordance with a still further embodiment of the present invention. As shown, the present fifth set includes a 4-bit code RL4(4) which is a code to be used for indicating a run length in a range from "1" to "13" and includes a 4-bit data $(RL)_2$ indicating the run length using the binary numbers. An 8-bit code RL4(8) is a code to be used for indicating a run length in a range from "12" to "31" and contains the binary data pattern of "110" in its eighth to sixth bit locations, which pattern indicates the fact that the code length is eight bits. In addition, in the fifth to first bit locations of the code is included a 5-bit data $(RL)_2$, which represents the run length by the binary numbers, with its MSB located at the fifth bit location. Furthermore, a 12-bit code RL4(12) is a code to be used for indicating a run length in a range from "32" to "255" and includes the binary data pattern of "1110" in its twelfth to ninth bit locations, which pattern indicates the fact that the code length of this code is 12 bits. In addition, in the eighth to first bit locations of this code is included an 8-bit data $(RL)_2$, which represents the run length by the binary numbers, with its MSB located at the eighth bit locatin. In addition, a 16-bit code RL4(16) is a code to be used for indicating a run length in a range from "256" to "4095" and includes the binary data pattern of "1111" in its sixteenth to thirteenth bit locations, which pattern indicates the fact that the code length of this code is 16 bits. In addition, in the twelfth to first bit locations of this code is included a 12-bit data $(RL)_2$, which represents the run length by the binary numbers, with its MSB located at the twelfth bit location.

Also included in this fifth set of run length codes is a code $RL4(8)_0$ which indicates run length "0" and which is formed from the 8-bit code RL4(8) with "0" assigned to each of the data $(RL)_2$. Also included is an end of line code EOL which indicates the end of a line and which is comprised of a 4-bit data of $(0000)_2$. In addition, an end of page code EOP is also provided, which is a 16-bit code indicating the end of a page and formed by connecting two of the run length "0" code of $RL4(8)_0$ back to back. It is to be noted that the procedure and rules of this fifth encoding scheme are similar to those described with respect to the previous schemes. It should also be noted that the run length encoding and decoding processing operations of these second to fifth schemes are basically the same as those of the first scheme.

Among those described above, the fifth scheme using the fifth set of run length codes illustrated in FIGS. 9a through 9g has the highest compression efficiency and has higher compression efficiencies than the case using the MH encoding scheme in most cases. In order to further enhance the compression efficiency, it can be contemplated to use different run length codes between the case of encoding white data and the case of encoding black data.

As described above, in accordance with the present invention, since the code length of each of run length codes is set as an integral multiple of a predetermined bits (4 bits in the illustrated embodiments, though the present invention should not be limited only to this specific number of bits), the encoding and decoding processing operations can be carried out at a practically acceptable speed even if use is made of a general purpose microcomputer, e.g., an 8-bit microcomputer, and, thus, there is no need to provide an expensive dedicated hardware in implementing these encoding and decoding processing operations.

In the above-described embodiments, it has been described regarding the case of the resolution of an image in the main scanning direction being 8 dots/mm; however, the run length codes of the present invention can realize a sufficiently practical compression efficiency even if the resolution is 16 dots/mm. However, if the resolution of an image in the main scanning direction (optical scanning direction along which the scanner scans an original image optically) is higher, e.g., 32 dots/mm, then there may be a case where an enhanced compression efficiency is obtained by changing the unit code length of the run length codes to 8 bits instead of 4 bits under the same concept as that of the above-described embodiments. Thus, the unit code length of a set of run length codes to be constructed in accordance with the principle of the present invention shoudld be determined appropriately in considerations of various factors involved in each of the specific applications. It should also be noted that the principle of the present invention can be applied to any other image processing system, e.g., facsimile machines, than that illustrated in FIG. 3.

As described above, in accordance with the present invention, a run length code has a format which begins with a code length data, which indicates the code length of the code, followed by a run length data of the binary representation, whereby the code length is set as an integral multiple of a predetermined number of bits. Therefore, the encoding and decoding processing of an image data can be carried out by software and using a general purpose microprocessor and the like at high speed, thereby permitting to implement real time processing without extensive hardware and to provide an inexpensive encoding/decoding system.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An encoding/decoding method for carrying out conversion between a run length and a corresponding run length code, said run length code has a format including a first part and a second part which follows said first part, said first part including first information indicating a length of said code and said second part including second information in the binary representation indicating the corresponding run length, said length of code being set an integral multiple of a predetermined number of bits.

2. The method of claim 1 wherein said first information is a predetermined binary data pattern.

3. A method of encoding an image signal using a plurality of predetermined run length codes, comprising the steps of;

scanning an original to produce an image signal;

determining a series of run lengths in said image data; and converting said series of run lengths into a corresponding series of said run length codes, whereby each of said run length codes has a format including a first part and a second part following said first part, said first part including information indicating the length of the code and said second part including information indicating a corresponding run length, each of said run length codes having a total number of bits which is an integral multiple of a predetermined number of bits.

4. The method of claim 3 wherein said step of scanning is carried out line by line and the set of conversion is also carried out line by line.

5. The method of claim 3 wherein said series of run lengths includes a first kind of run length defined by at least one white pixel and a second kind of run length defined by at least one black pixel.

* * * * *